Figure 1:
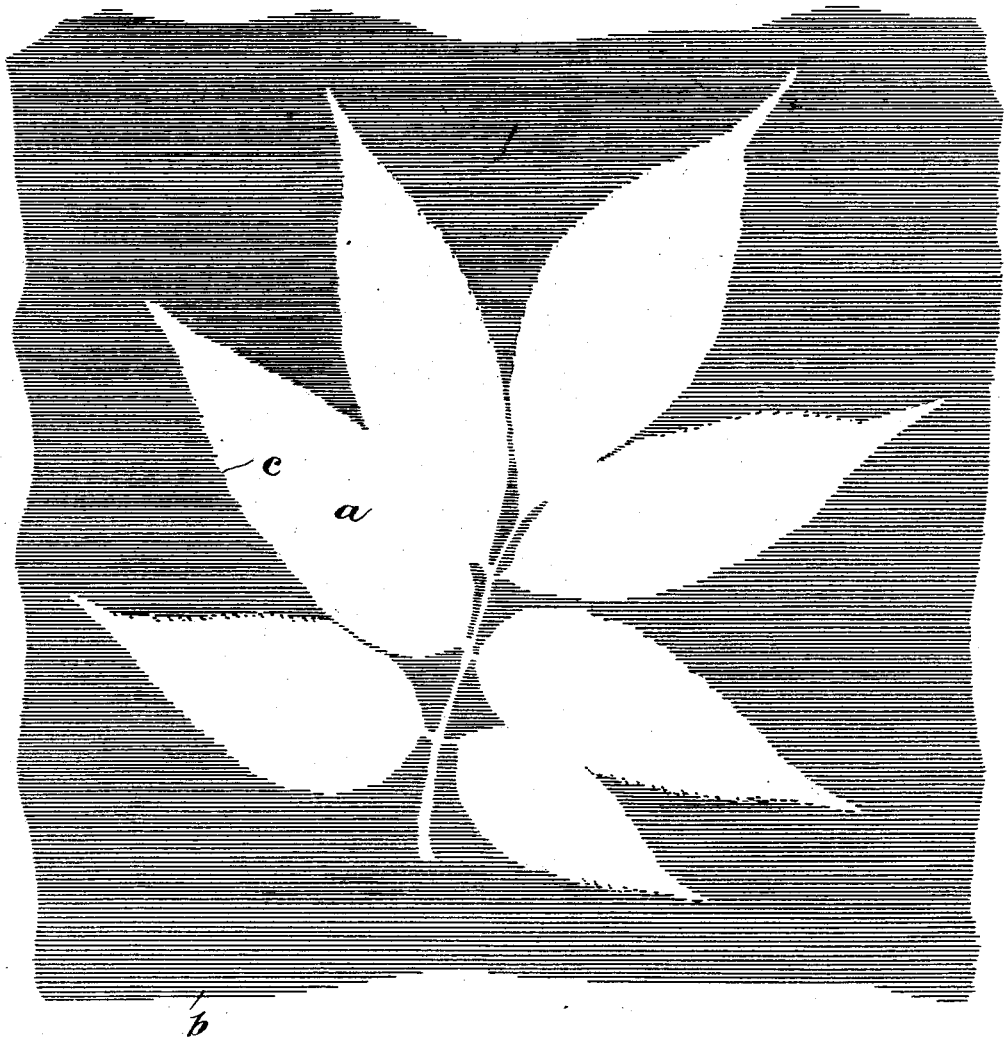

No. 764,938. PATENTED JULY 12, 1904.
B. E. GAGE.
PROCESS OF MAKING PRINTS FROM NATURAL OBJECTS.
APPLICATION FILED NOV. 8, 1902.
NO MODEL. 3 SHEETS—SHEET 1.

Witnesses,
Inventor,
Benjamin E. Gage
By Offield, Towle & Linthicum
Attys.

No. 764,938. PATENTED JULY 12, 1904.
B. E. GAGE.
PROCESS OF MAKING PRINTS FROM NATURAL OBJECTS.
APPLICATION FILED NOV. 8, 1902.
NO MODEL. 3 SHEETS—SHEET 2.
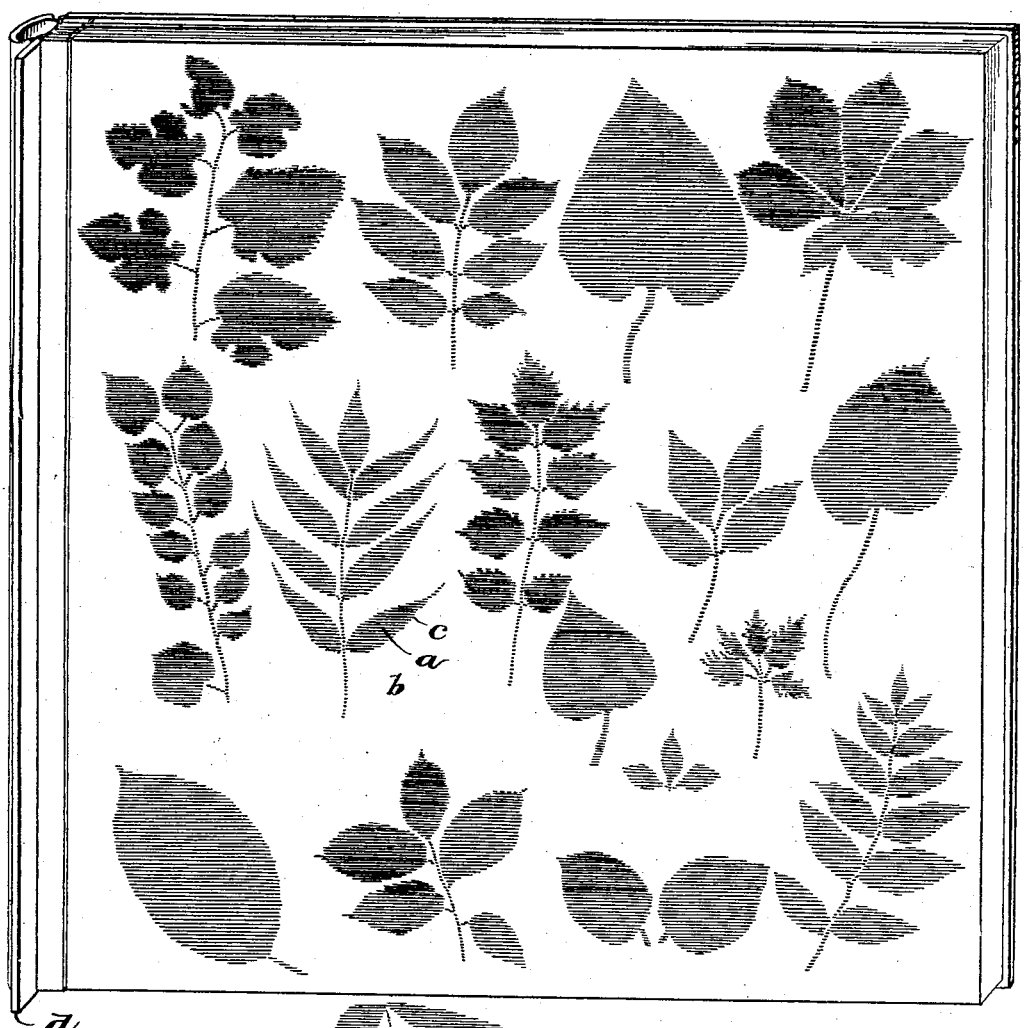

No. 764,938. PATENTED JULY 12, 1904.
B. E. GAGE.
PROCESS OF MAKING PRINTS FROM NATURAL OBJECTS.
APPLICATION FILED NOV. 8, 1902.

NO MODEL. 3 SHEETS—SHEET 3.

No. 764,938. Patented July 12, 1904.

UNITED STATES PATENT OFFICE.

BENJAMIN E. GAGE, OF CHICAGO, ILLINOIS.

PROCESS OF MAKING PRINTS FROM NATURAL OBJECTS.

SPECIFICATION forming part of Letters Patent No. 764,938, dated July 12, 1904.

Application filed November 8, 1902. Serial No. 130,540. (No specimens.)

*To all whom it may concern:*

Be it known that I, BENJAMIN E. GAGE, a citizen of the United States, residing at Chicago, Illinois, have invented certain new and useful Improvements in Processes of Making Prints from Natural Objects, of which the following is a specification.

My invention has for its purpose to provide means whereby exact representations of natural objects—such as the leaves of plants, the wings of birds or insects, patterns of lace or other open-work fabrics, or the like—may be made with absolute fidelity and accuracy at a cost which shall make such illustrations available for commercial purposes.

The common method of illustrating leaf forms or the like has been to first make a pen-and-ink drawing and then to proceed by one of several methods to produce a picture from such drawing. These drawings are not only expensive, but they are inexact. For example, an artist drawing a picture of a leaf will either select a perfect leaf, or if the leaf be imperfect the tendency is to correct such imperfections, and there is always present in work of this character the disposition to create or produce types rather than to copy absolutely the natural object. Again, it will be found by observation that natural forms—such, for example, as the leaves from a certain plant—are not uniform, but, on the contrary, that there are many varieties in shapes and details even among leaves growing on the same branch.

For some purposes—such, for example, as in the teaching of botany—it is desirable to be able to represent exactly and accurately the true natural forms in such manner as to emphasize their differences in details as markedly as their similarities in general form and structure. No convenient and economical method of reproducing natural objects, such as leaves or wings of insects and the like, has been heretofore provided so far as I am aware.

In carrying out my invention I take the natural objects, such as the leaves of plants or the wings of insects or birds, and place them upon a sheet of sensitized paper, such as the ordinary blue-print paper or any of the other kinds from which sun-prints are made. These natural forms, leaves, wings, or the like are then exposed to the sunlight for a sufficient length of time to effect the printing, in which operation the rays of light will of course be intercepted completely by the opaque portions of the leaf or other object, thus producing a negative showing the outline of the leaf or other object in white on a blue background, or a negative may be produced in like manner which will show the leaf outline in white on a brown background, according to the character of the sensitized paper employed, and from this negative additional prints may be made, either blue on a white background or brown on a white background. These prints will give only the outlines of the object, and in order to obtain a reproduction of the skeleton of a leaf, for example, I proceed as follows: The original leaf used to make the blue-print is treated in such a way as to remove all the soft matter, leaving only the skeleton, consisting of the ribs, veins, and harder parts of the leaf. This may be accomplished by maceration by immersing the leaf in water until the soft parts decay, or they may be quickly destroyed by treatment with a solution produced by dissolving a quantity of sodium carbonate in water and adding thereto a solution of chlorid of lime. When the skeleton is obtained, it is placed in proper position on the negative and the whole is placed on a sensitized sheet, thus obtaining a positive of the leaf on a white background with the ribs appearing by white lines in proper position. A half-tone or zinc-etching may be made directly from such a print, or by printing from the last-named positive a print may be obtained showing the leaf in white on a dark background with the ribs indicated by dark lines.

In the accompanying drawings I have shown typical prints and a method of mounting the same.

Figure 4:
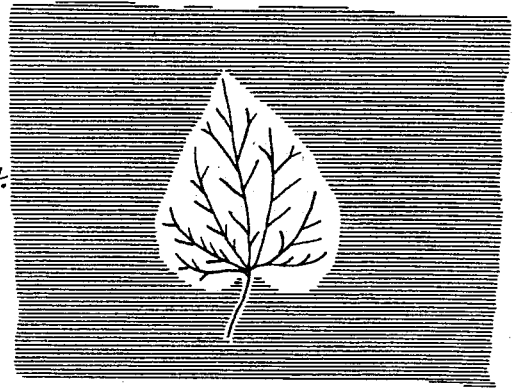
Figure 5:
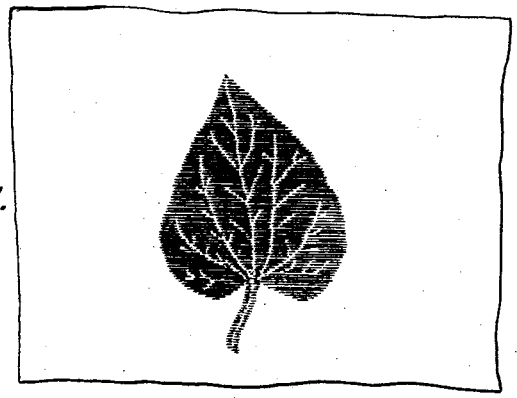

In the drawings, Figure 1 is a representation of a spray of leaves in outline upon a blue background. Fig. 2 shows a collection of leaf forms upon a mounted sheet arranged for display, and Figs. 3, 4, 5, and 6 represent progressive steps in carrying out the process, Fig. 3 representing a negative of a single leaf corresponding to Fig. 1, Fig. 4 showing the same with the skeleton of the leaf superposed thereon, Fig. 5 showing a positive print made from the negative of Fig. 4 plus the skeleton, and Fig. 6 showing a negative print made from the positive of Fig. 5.

In the drawings, Fig. 1, the leaves $a$ are shown in outline upon a background $b$, represented by the shading as blue. Such a reproduction is made by laying a spray of leaves upon a sheet of blue-print paper and exposing it to the rays of the sun for a brief time, on a similar reproduction on a dark-brown background may be made by employing a bromid paper. The body of the particular leaf is opaque—that is, it does not transmit with ordinary printing any rays of light, and the result is that the leaf is shown only in outline, the rib and veins being omitted. The detail of the edge of the leaf is very clearly defined, however, as indicated at $c$, and it may be remarked that the drawing in this case was reproduced from a blue-print of a spray of leaves, so that the representation is true to nature, except for such inaccuracies as may be due to the work of the draftsman. It will be observed from examination of this illustration that the leaves are of various shapes and are neither regular in form nor do their margins present the same dentations.

In Fig. 2 a collection of leaf outlines is shown, the leaves being dark upon a white background, such as would be produced by taking a print from a negative of the group made as described in connection with Fig. 1.

Figure 3:
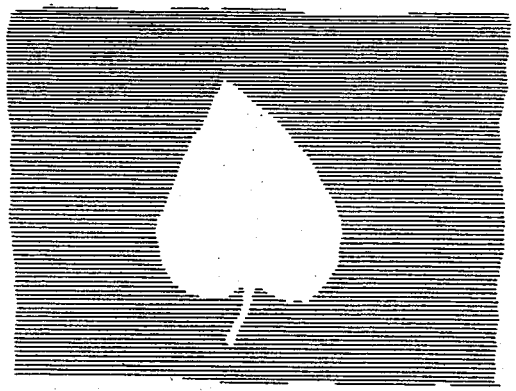

Fig. 3 represents a negative of a single leaf formed in the manner already described in connection with Fig. 1. To obtain a positive print of this leaf which shall show the ribs and veins thereof, I superpose upon the white outline of the leaf the skeleton of the latter obtained as hereinabove described, the negative with the superposed skeleton being illustrated in Fig. 4. By printing from this I obtain a positive print of the leaf on a white background, the skeleton of the leaf of course appearing in white, as illustrated by Fig. 5. For practical purposes and for the purposes of commercial reproduction, as by half-tones or zinc-etchings, the process may end here; but if it is desired to obtain a negative print, showing the leaf not only in outline, but with its skeleton, this may be done by printing from the positive, (shown in Fig. 5,) which of course yields a print wherein the leaf appears in white on a dark background with its ribs and veins shown by dark lines, as illustrated in Fig. 6.

For commercial purposes these prints may be mounted and assembled in albums or portfolios. For use by lecturers in schools these prints are preferably mounted upon swinging frames $d$, so that they may be conveniently and successively exposed.

It will be observed that these forms when made by printing directly from the natural object will be absolutely perfect—that is to say, natural—and in that respect superior for purposes of instruction and comparison to pictures made from pen and ink or other drawings. It is further to be observed that these prints or illustrations are not only accurate, but that by this means of production the forms can readily be provided for study at seasons of the year when it is impossible to obtain the natural leaf or other object under study. It may also be remarked that for purposes of comparison it is desirable to have a number of kinds or varieties of representations upon the same sheet, and this can be conveniently done by suitably arranging the natural objects and producing therefrom a pictorial representation which may be made to illustrate the variation of species, progress from the simpler to the more complex forms, and points of resemblance and difference between the specimens under consideration. These representations while perfect, as above stated, can be made so cheaply that they can be used for a great variety of commercial purposes—for example, in the illustration of catalogues, as well as for educational and other purposes, where accuracy is the prime consideration.

Of course the printing from a natural object is a useful and valuable step in methods of reproduction, and by the application of appropriate processes the precise and exact reproduction of any natural object capable of being thus used is rendered feasible.

I claim—

1. The method of producing illustrations of natural objects, such as leaves and the like, which consists in first producing a negative print from the natural object by superposing the same upon a sensitized sheet and exposing the latter to the light, then removing the softer portions of the object from the skeleton, then superposing such skeleton upon the outline of the negative, and then taking a positive print therefrom, substantially as described.

2. The method of producing illustrations of natural objects, such as leaves and the like, which consists in first producing a negative print from the natural object by superposing the same upon a sensitized sheet and exposing the latter to the light, then removing the softer portions of the object from the skeleton, then superposing such skeleton upon the negative outline of the object and making a positive print therefrom, and finally printing from said positive upon a sensitized sheet and obtaining a negative thereof, substantially as described.

BENJAMIN E. GAGE.

Witnesses:
GENEVIEVE DE KENT,
FREDERICK C. GOODWIN.